United States Patent
Stuckman et al.

(10) Patent No.: US 12,130,619 B2
(45) Date of Patent: *Oct. 29, 2024

(54) RADIO CONTROLLED AIRCRAFT, REMOTE CONTROLLER AND METHODS FOR USE THEREWITH

(71) Applicant: Drone-Control, LLC, Austin, TX (US)

(72) Inventors: Katherine C. Stuckman, Menlo Park, CA (US); Michael D. Reynolds, Cedar Park, TX (US)

(73) Assignee: Drone-Control, LLC, Austin, TX (US)

( * ) Notice: Subject to any disclaimer, the term of this patent is extended or adjusted under 35 U.S.C. 154(b) by 381 days.

This patent is subject to a terminal disclaimer.

(21) Appl. No.: 17/666,698

(22) Filed: Feb. 8, 2022

(65) Prior Publication Data
US 2022/0163962 A1     May 26, 2022

Related U.S. Application Data

(60) Continuation of application No. 16/229,994, filed on Dec. 21, 2018, now Pat. No. 11,281,205, which is a
(Continued)

(51) Int. Cl.
*G05D 1/00* (2024.01)
*A63H 27/00* (2006.01)
(Continued)

(52) U.S. Cl.
CPC ......... *G05D 1/0022* (2013.01); *A63H 27/004* (2013.01); *A63H 27/02* (2013.01);
(Continued)

(58) Field of Classification Search
CPC .. G05D 1/0022; G05D 1/0033; G05D 1/0202; G05D 1/0808; A63H 27/004;
(Continued)

(56) References Cited

U.S. PATENT DOCUMENTS

| 418,805 A | 1/1890 | Miller |
| 3,053,480 A | 9/1962 | Vanderlip |

(Continued)

FOREIGN PATENT DOCUMENTS

| AU | 558442 B2 | 1/1987 |
| AU | 636484 B2 | 4/1993 |

(Continued)

OTHER PUBLICATIONS

"Blade CP Pro Manual," E-flite, Horizon Hobby, Inc., 2006, 64 pages.
(Continued)

*Primary Examiner* — Peter D Nolan
*Assistant Examiner* — Luke Huynh
(74) *Attorney, Agent, or Firm* — Garlick & Markison; Bruce E. Stuckman

(57) ABSTRACT

A radio controlled (RC) vehicle includes a receiver that is coupled to receive an RF signal from a remote control device, the RF signal containing command data in accordance with a first coordinate system, wherein the first coordinate system is from a perspective of the remote control device. A motion sensing module generates motion data based on the motion of the RC vehicle. A processing module transforms the command data into control data in accordance with a second coordinate system, wherein the second coordinate system is from a perspective of the RC vehicle. A plurality of control devices control the motion of the RC vehicle based on the control data.

20 Claims, 8 Drawing Sheets

Related U.S. Application Data continuation of application No. 15/392,687, filed on Dec. 28, 2016, now Pat. No. 10,248,117, which is a continuation of application No. 14/724,037, filed on May 28, 2015, now Pat. No. 9,568,913, which is a continuation of application No. 14/102,995, filed on Dec. 11, 2013, now Pat. No. 9,079,116, which is a continuation of application No. 13/688,886, filed on Nov. 29, 2012, now Pat. No. 8,649,918, which is a continuation of application No. 13/471,642, filed on May 15, 2012, now Pat. No. 8,380,368, which is a division of application No. 12/029,470, filed on Feb. 12, 2008, now Pat. No. 8,200,375.

(51) Int. Cl.
| | | |
|---|---|---|
| A63H 30/04 | (2006.01) | |
| A63H 31/10 | (2006.01) | |
| B64C 19/00 | (2006.01) | |
| B64C 27/57 | (2006.01) | |
| B64C 39/02 | (2023.01) | |
| B64U 10/10 | (2023.01) | |

(52) U.S. Cl.
CPC ............ *A63H 27/12* (2013.01); *A63H 30/04* (2013.01); *A63H 31/10* (2013.01); *B64C 19/00* (2013.01); *B64C 27/57* (2013.01); *B64C 39/024* (2013.01); *G05D 1/0033* (2013.01); *G05D 1/0202* (2013.01); *G05D 1/0808* (2013.01); *B64U 10/10* (2023.01); *B64U 2201/20* (2023.01)

(58) Field of Classification Search
CPC ........ A63H 27/02; A63H 27/12; A63H 30/04; A63H 31/10; B64C 19/00; B64C 27/57; B64C 39/024
See application file for complete search history.

(56) References Cited

U.S. PATENT DOCUMENTS

| | | |
|---|---|---|
| 3,094,299 A | 6/1963 | Bond |
| 3,534,399 A | 10/1970 | Hirsch |
| 4,375,631 A | 3/1983 | Goldberg |
| 4,466,774 A | 8/1984 | Cycon |
| 4,490,710 A | 12/1984 | Kopsho, Jr. |
| 4,770,607 A | 9/1988 | Cycon |
| 4,964,598 A | 10/1990 | Berejik |
| 5,001,646 A | 3/1991 | Caldwell |
| 5,043,646 A | 8/1991 | Smith, III |
| 5,048,652 A | 9/1991 | Cycon |
| 5,058,824 A | 10/1991 | Cycon |
| 5,152,478 A | 10/1992 | Cycon |
| 5,226,350 A | 7/1993 | Cycon |
| 5,277,380 A | 1/1994 | Cycon |
| 5,281,099 A | 1/1994 | Hunter |
| 5,301,568 A | 4/1994 | Kono |
| 5,340,279 A | 8/1994 | Cycon |
| 5,351,913 A | 10/1994 | Cycon |
| 5,364,230 A | 11/1994 | Krauss |
| 5,429,089 A * | 7/1995 | Thornberg ............ F02D 31/007 123/352 |
| 5,552,983 A | 9/1996 | Thornberg |
| 5,575,438 A | 11/1996 | McGonigle |
| 5,676,334 A | 10/1997 | Cotton |
| 5,859,372 A | 1/1999 | Neltoft |
| 5,890,441 A | 4/1999 | Swinson |
| 5,984,240 A | 11/1999 | Shinagawa |
| 6,076,024 A | 6/2000 | Thornberg |
| 6,092,007 A | 7/2000 | Cotton |
| 6,170,778 B1 | 1/2001 | Cycon |
| 6,270,038 B1 | 8/2001 | Cycon |
| 6,460,810 B2 | 10/2002 | James |
| 6,478,262 B1 | 11/2002 | Kinkead |
| 6,527,225 B1 | 3/2003 | Silder, Jr. |
| 6,584,382 B2 | 6/2003 | Karem |
| 6,629,023 B1 | 9/2003 | Silder, Jr. |
| 6,694,228 B2 | 2/2004 | Rios |
| 6,697,715 B1 | 2/2004 | Freeman |
| 6,856,894 B1 | 2/2005 | Bodin |
| 6,885,917 B2 | 4/2005 | Osder |
| 7,101,246 B1 | 9/2006 | Dammar |
| 7,130,741 B2 | 10/2006 | Bodin |
| 7,286,913 B2 | 10/2007 | Bodin |
| 7,497,759 B1 | 3/2009 | Davis |
| 7,526,362 B2 | 4/2009 | Kim |
| 7,873,444 B1 | 1/2011 | Ehrmantraut et al. |
| 8,014,909 B2 | 9/2011 | Bulita et al. |
| 8,200,375 B2 | 6/2012 | Stuckman |
| 8,380,368 B2 | 2/2013 | Stuckman |
| 8,649,918 B2 | 2/2014 | Stuckman |
| 8,903,568 B1 * | 12/2014 | Wang .................. G05D 1/0038 701/2 |
| 9,079,116 B2 | 7/2015 | Stuckman |
| 9,568,913 B2 | 2/2017 | Stuckman |
| 9,589,476 B2 | 3/2017 | Zhang |
| 9,904,292 B2 | 2/2018 | Pedersen |
| 10,095,226 B1 | 10/2018 | Stuckman |
| 11,281,205 B2 * | 3/2022 | Stuckman ............ G05D 1/0202 |
| 11,427,305 B1 * | 8/2022 | Wiegman ............ G05D 1/0055 |
| 2002/0104921 A1 | 8/2002 | Louvel |
| 2002/0163905 A1 | 11/2002 | Brabrand |
| 2004/0068333 A1 | 4/2004 | Cantello et al. |
| 2005/0094851 A1 | 5/2005 | Bodin |
| 2005/0127242 A1 | 6/2005 | Rivers |
| 2006/0144994 A1 | 7/2006 | Spirov et al. |
| 2006/0155508 A1 | 7/2006 | Choi |
| 2006/0178085 A1 | 8/2006 | Sotereanos |
| 2007/0105474 A1 | 5/2007 | Gotou |
| 2007/0168157 A1 | 7/2007 | Khibnik |
| 2007/0221780 A1 | 9/2007 | Builta |
| 2007/0260726 A1 | 11/2007 | Rozak |
| 2009/0004004 A1 | 1/2009 | Paul |
| 2009/0050747 A1 | 2/2009 | Troutman |
| 2009/0204276 A1 | 8/2009 | Stuckman |
| 2010/0012776 A1 | 1/2010 | Hursig |
| 2010/0161155 A1 | 6/2010 | Simeray |
| 2010/0292868 A1 | 11/2010 | Rotem |
| 2016/0091894 A1 | 3/2016 | Zhang |
| 2016/0093124 A1 | 3/2016 | Shi |

FOREIGN PATENT DOCUMENTS

| | | |
|---|---|---|
| AU | 664144 B2 | 11/1995 |
| AU | 664522 B2 | 11/1995 |
| AU | 664678 B2 | 11/1995 |
| AU | 665319 B2 | 12/1995 |
| AU | 667650 B2 | 3/1996 |
| AU | 683551 B2 | 11/1997 |
| AU | 693202 B2 | 6/1998 |
| AU | 697735 B2 | 10/1998 |
| AU | 708402 B2 | 8/1999 |
| AU | 1755241 B2 | 12/2002 |
| AU | 772173 B2 | 4/2004 |
| CA | 2030612 A1 | 5/1991 |
| CN | 1843710 A | 10/2006 |
| CN | 1843847 A | 10/2006 |
| EP | 0430855 A1 | 6/1991 |
| EP | 0522829 A2 | 1/1993 |
| EP | 0457710 B1 | 3/1995 |
| EP | 0752634 A1 | 1/1997 |
| EP | 0748470 B1 | 12/1997 |
| EP | 0758972 B1 | 3/1998 |
| EP | 0646084 B1 | 5/1998 |
| EP | 0861777 A1 | 9/1998 |
| EP | 0861778 A1 | 9/1998 |
| EP | 0755481 B1 | 10/1998 |
| EP | 1080398 B1 | 1/2002 |
| EP | 0861775 B1 | 11/2002 |
| EP | 0861776 B1 | 11/2002 |
| EP | 0861779 B1 | 11/2002 |
| EP | 1175336 B1 | 7/2003 |

(56) References Cited

FOREIGN PATENT DOCUMENTS

| | | | |
|---|---|---|---|
| EP | 1660958 B1 | 4/2012 |
| IL | 98102 A | 4/1993 |
| IL | 125019 A | 4/2001 |
| IL | 139206 A | 7/2004 |
| IT | 1169792 B | 6/1987 |
| JP | 446897 A | 2/1992 |
| JP | 619854 A | 1/1993 |
| JP | 0810451 A | 1/1996 |
| JP | 1193812 A | 4/1999 |
| RU | 2062246 C1 | 6/1996 |
| RU | 2108267 C1 | 4/1998 |
| RU | 2108269 C1 | 4/1998 |
| RU | 2113378 C1 | 6/1998 |
| RU | 2114766 C1 | 7/1998 |
| RU | 2117604 C1 | 8/1998 |
| WO | 106090 A | 3/1998 |
| WO | 0064735 A1 | 11/2000 |
| WO | 0064736 A1 | 11/2000 |
| WO | 0195043 A1 | 12/2001 |

OTHER PUBLICATIONS

"Blade CX2 Manual," E-flite, Horizon Hobby, Inc., 2006, 48 pages.
"Rmax G1," Yamaha, <hllps://global.yamaha-motor.com/jp/news/2005/1017/rmax_g1.html>, Oct. 17, 2005, 3pages.
"Twister Aggressor2.4: Ready to Fly 4 Channel R/C Helicopter Assembly & Flight Training guide," J.Perkins Distribution, <http://modelengines.com.au>, 2008, 28 pages.
"Twister Bell Medevac 2.4: Ready to Fly 4 Channel R/C Helicopter Assembly & Flight Training guide," J. Perkins Distribution, <http://www.jperkinsdistribution.co.uk>, 2007, 32 pages.
"Twister Bell Medevac: Ready to Fly 4 Channel R/C Helicopter Assembly & Flight Training guide," Exhibit A, J. Perkins Distribution, <http://www.modelengines.com.au>, 2006, 32 pages.
"TypeIIG (RMAX)," Yamaha, <hllps://global.yamaha-motor.com/jp/news/2002/0925/sky.html>, Sep. 25, 2002, 3 pages.
"Yamaha's RMAX Series Unmanned Helicopter," Yamaha News No. 6, Yamaha Motor Co., Ltd., Nov. 1, 2003, 16 pages.
Annotated Figure 4 of JP Patent Publication 2001-209427, 1 page.
Annotated Figure 5 of JP Patent Publication 2001-209427, 1 page.
Annotated Figure 5 of U.S. Pat. No. 8,200,375 issued Jun. 12, 2012, 1 page.
Bouabdallah et al., "Design and Control of an Indoor Coaxial Helicopter," Intelligent Robots and Systems, 2006 EEE/RSJ International Conference, Jan. 15, 2007, 6 pages.
Carstens, "Development of a Low-Cost, Low-Weight Flight Control System for an Electrically Powered Model Helicopter," Stellenbosch University, Apr. 2005, 168 pages.
Conte, "Navigation Functionalities for an Autonomous UAV Helicopter," Linkoping Studies in Science and Technology, Thesis No. 1307, Mar. 2007, 127 pages.
Cooper et al., "Sikorsky Aircraft UAV Development," Nineteenth European Rotorcraft Forum, Paper No. D3, Sep. 14-16, 1993, 10 pages.
Cycon et al., "Progressive Engagement Clutch," Australian Patent Application No. 66870/90, Application Date Nov. 22, 1990, 16 pages.
Decision Granting Institution of Inter Partes Review 35 U.S.C. § 314(a), *SZ DJI Technology Co., Ltd. and Parrot Inc. v. Synergy Drone LLC*, Case No. IPR2018-00204, U.S. Pat. No. 8,200,375, May 31, 2018, 23 pages.
Decision Granting Institution of Inter Partes Review 35 U.S.C. § 314(a), *SZ DjI Technology Co., Ltd. and Parrot Inc. v. Synergy Drone LLC*, Case No. IPR2018-00207, U.S. Pat. No. 9,079,116, Jun. 13, 2018, 24 pages.
Decision Granting Institution of Inter Partes Review 35 U.S.C. § 314(a), *SZ DJI Technology Co., Ltd. and Parrot Inc., v. Synergy Drone LLC*, Case No. IPR2018-00205, U.S. Pat. No. 8,380,368, May 31, 2018, 21 pages.
Decision Granting Institution of Inter Partes Review 35 U.S.C. § 314, *SZ DJI Technology Co., Ltd. and Parrot Inc. v. Synergy Drone LLC*, Case No. IPR2018-00206, U.S. Pat. No. 3,649,918, May 31, 2018, 26 pages.
Decision Granting Institution of Inter Partes Review 35 U.S.C. § 314, *SZ DJI Technology Co., Ltd. and Parrot Inc. v. Synergy Drone LLC*, Case No. IPR2018-00208, U.S. Pat. No. 9,568,913, Jun. 29, 2018, 28 pages.
Declaration of Coral Sheldon-Hess dated Nov. 17, 2017, 39 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00204, U.S. Pat. No. 8,200,375, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00205, U.S. Pat. No. 8,380,368, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00206, U.S. Pat. No. 8,649,918, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00207, U.S. Pat. No. 9,079,116, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00208, U.S. Pat. No. 9,568,913, dated Sep. 11, 2018, 44 pages.
Declaration of Edmond J. Murphy, Ph.D., *SZ DJI Technology Co., Ltd. and Parrot Inc. v. Synergy Drone LLC*, Inter Partes Review, Case No. IPR2018-00204, U.S. Pat. No. 8,200,375, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00205, U.S. Pat. No. 8,380,368, dated Sep. 11, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00206, U.S. Pat. No. 8,649,918, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00207, U.S. Pat. No. 9,079, 116, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00208, U.S. Pat. No. 9,568,913, dated Dec. 7, 2018, 56 pages.
Declaration of Masafumi Miwa, Ph.D., Translation included, dated Nov. 17, 2017, 10 pages.
Declaration of R. John Hansman, Jr., Ph.D., *SZ DJI Technology Co., Ltd. and Parrot Inc. v. Synergy Drone LLC*, Inter Partes Review, Case No. IPR2018-00204, U.S. Pat. No. 8,200,375, dated Nov. 22, 2017, 274 pages.
Declaration of R. John Hansman, Jr., Ph.D., *SZ DJI Technology Co., Ltd. and Parrot Inc. v. Synergy Drone LLC*, Inter Partes Review, Case No. IPR2018-00205, U.S. Pat. No. 8,380,368, dated Nov. 22, 2017, 274 pages.
Declaration of R. John Hansman, Jr., Ph.D., *SZ DJI Technology Co., Ltd. and Parrot Inc. v. Synergy Drone LLC*, Inter Partes Review, Case No. IPR2018-00206, U.S. Pat. No. 8,649,918, dated Nov. 22, 2017, 274 pages.
Declaration of R. John Hansman, Jr., Ph.D., *SZ DJI Technology Co., Ltd. and Parrot Inc. v. Synergy Drone LLC*, Inter Partes Review, Case No. IPR2018-00207, U.S. Pat. No. 9,079,116, dated Nov. 22, 2017, 274 pages.
Declaration of R. John Hansman, Jr., Ph.D., *SZ DJI Technology Co., Ltd. and Parrot Inc. v. Synergy Drone LLC*, Inter Partes Review, Case No. IPR2018-00208, U.S. Pat. No. 9,568,913, dated Nov. 22, 2017, 274 pages.
Definition of "Motion", Webster's New Universal Unabridged Dictionary, Deluxe Second Edition, Dorset & Baber, 1983, p. 1173.

(56) References Cited

OTHER PUBLICATIONS

Definition of "Proportional", The American Heritage College Dictionary, Third Edition, Houghton Mifflin Company, 1997, p. 1097.
Dictionary of Aeronautical English, Fitzroy Dearborn Publishers, 1999, p. 150.
Draper, "Advanced UMV Operator Interfaces," Air Force Research Laboratory, Dec. 2005, 11 pages.
Duranti et al., "In-flight Identification of the Augmented Flight Dynamics of the Rmax Unmanned Helicopter," 17th FAC Symposium on Automatic Control in Aerospace, International Federation of Automatic Control, 2007, 7 pages.
Fang, "Design of Flight Control and Managing Computer for a Small Reconnaissance UAV," Institute of UAV, Northwestern Polytechnical University, Xian 710072, China, <http://www.cqvip.com>, May 27, 2003, 3 pages.
Patent No. 8200375 issued Jun. 12, 2012, USPTO, certified Jul. 11, 2017, pp. 1 through 150.
Gerig, "Modeling, guidance, and control of aerobatic maneuvers of an autonomous helicopter," ETH Zurich Research collection, Dissertation No. 17805, 2008, 179 pages.
Hall et al., "Synthesis of Hover Autopilots for Rotary-Wing VTOL Aircraft," SUDAAR No. 446, Guidance and Control Laboratory, Center for Systems Research, Department of Aeronautics and Astronautics, Stanford University, Jun. 1972, 31 pages.
Hanlon, M. "Yamaha's RMAX—the worlds most advanced nonmilitary UAV" www.gizmag.com/go/2440, Nov. 19, 2004.
Hansman, Robert John, Jr., Curriculum Vitae, 32 pages.
How et al., "Real-Time Indoor Autonomous Vehicle Test Environment," IEEE Control Systems Magazine, Apr. 2008, pp. 51-64.

\* cited by examiner

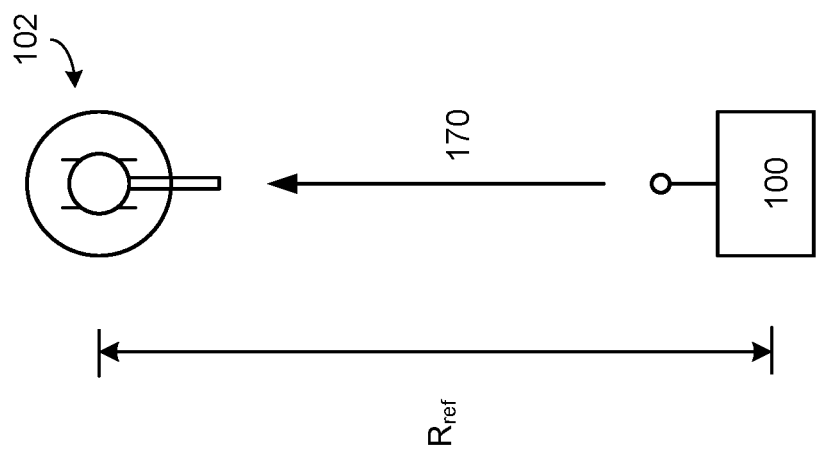

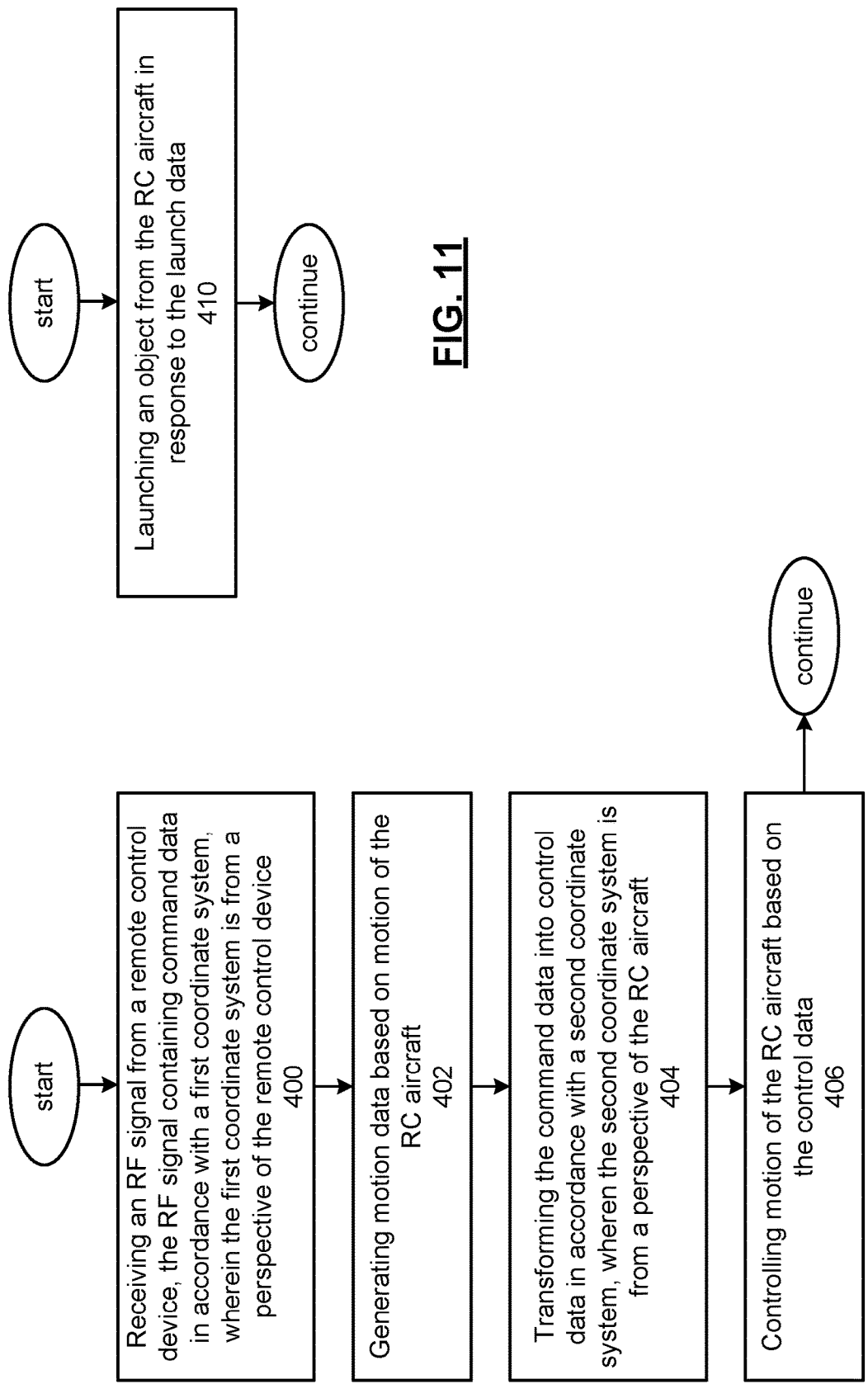

RADIO CONTROLLED AIRCRAFT, REMOTE CONTROLLER AND METHODS FOR USE THEREWITH

CROSS REFERENCE TO RELATED APPLICATIONS

The present U.S. Utility Patent Application claims priority pursuant to 35 U.S.C. § 120 as a continuation of U.S. Utility application Ser. No. 16/229,994, entitled "RADIO CONTROLLED AIRCRAFT, REMOTE CONTROLLER AND METHODS FOR USE THEREWITH", filed Dec. 21, 2018, which is a continuation of U.S. Utility application Ser. No. 15/392,687, entitled "RADIO CONTROLLED AIRCRAFT, REMOTE CONTROLLER AND METHODS FOR USE THEREWITH", filed Dec. 28, 2016, issued as U.S. Pat. No. 10,248,117 on Apr. 2, 2019, which is a continuation of U.S. Utility application Ser. No. 14/724,037, entitled "RADIO CONTROLLED AIRCRAFT, REMOTE CONTROLLER AND METHODS FOR USE THEREWITH", filed May 28, 2015, issued as U.S. Pat. No. 9,568,913 on Feb. 14, 2017, which is a continuation of U.S. Utility application Ser. No. 14/102,995, entitled "RADIO CONTROLLED AIRCRAFT, REMOTE CONTROLLER AND METHODS FOR USE THEREWITH", filed Dec. 11, 2013, issued as U.S. Pat. No. 9,079,116 on Jul. 14, 2015, which is a continuation of U.S. Utility patent application Ser. No. 13/688,886, entitled "RADIO CONTROLLED VEHICLE, REMOTE CONTROLLER AND METHODS FOR USE THEREWITH," filed on Nov. 29, 2012, issued as U.S. Pat. No. 8,649,918 on Feb. 11, 2014, which is a continuation of U.S. Utility patent application Ser. No. 13/471,642, entitled "RADIO CONTROLLED AIRCRAFT, REMOTE CONTROLLER AND METHODS FOR USE THEREWITH," filed on May 15, 2012, issued as U.S. Pat. No. 8,380,368 on Feb. 19, 2013, which is a divisional of U.S. Utility patent application Ser. No. 12/029,470, entitled "RADIO CONTROLLED AIRCRAFT, REMOTE CONTROLLER AND METHODS FOR USE THEREWITH," filed on Feb. 12, 2008, issued as U.S. Pat. No. 8,200,375 on Jun. 12, 2012, all of which are hereby incorporated herein by reference in their entirety and made part of the present U.S. Utility Patent Application for all purposes.

TECHNICAL FIELD OF THE INVENTION

This invention relates generally to radio controlled toys such as airplanes and helicopters.

DESCRIPTION OF RELATED ART

Radio controlled toys such as airplanes, boats, cars and helicopters are popular. Through the use of a remote control, a user can control the motion of the toy. Radio signals from the remote control, containing commands from the user, are sent to the toy to control the motion of the toy. Some radio control devices, such as airplanes and helicopters can be very difficult to control. These devices operate in three-dimensional space and can require great skill on the part of the user to operate. In particular, the user is required to consider the perspective of an aircraft when operating the remote control. The same commands that would make the aircraft turn right when the aircraft is moving toward the user, make the aircraft turn left when traveling away from the user. Simpler controls are needed to enable these devices to be operated by users with less training or skill.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 8:
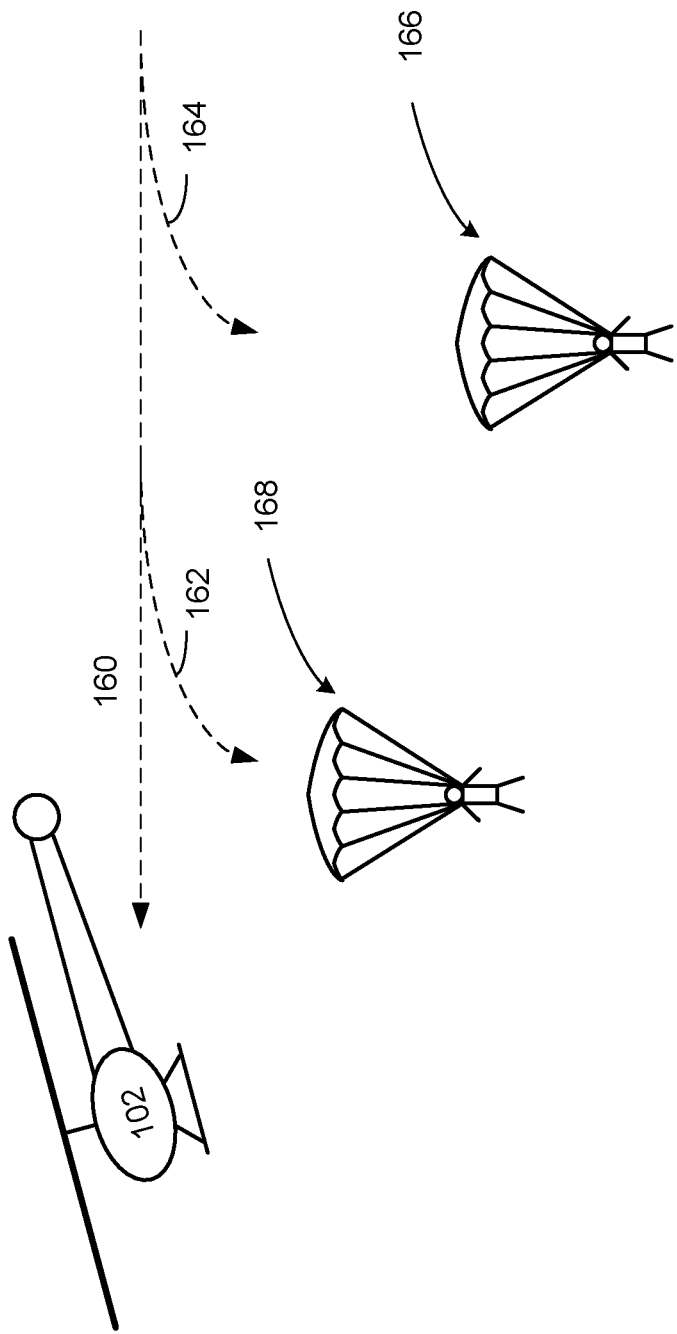

FIG. 8 is a pictorial representation of a radio controlled aircraft 102 launching parachutists 166 and 168 in accordance with an embodiment of the present invention.

FIG. 9 is a pictorial/block diagram representation of the set-up of remote control device 100 and radio controlled aircraft 102 in accordance with an embodiment of the present invention.

FIG. 10 is a flowchart representation of a method in accordance with an embodiment of the present invention.

FIG. 11 is a flowchart representation of a method in accordance with an embodiment of the present invention.

DETAILED DESCRIPTION OF THE INVENTION

Figure 1:
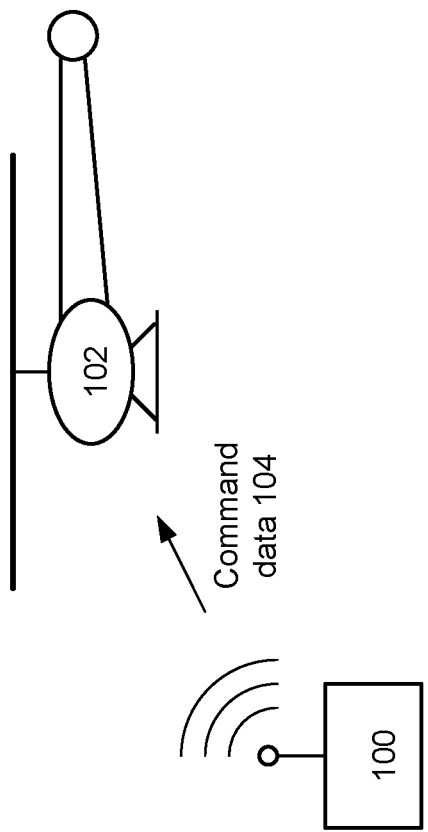
FIG. 1 is a pictorial/block diagram representation of a remote control device 100 and radio controlled aircraft 102 in accordance with an embodiment of the present invention.

FIG. 1 is a pictorial/block diagram representation of a remote control device 100 and radio controlled aircraft 102 in accordance with an embodiment of the present invention. In particular, a radio controlled (RC) aircraft 102, such as a helicopter or other aircraft, operates in response to command data 104 received from remote control device 100. In particular, remote control 100 and/or RC aircraft 102 are configured to provide an easier operation by the user. While described in terms of the operation an RC aircraft, other RC devices such as cars and boats can likewise be implemented in accordance with the present invention.

Several enhancements are presented along with various optional features that will be described in greater detail in conjunction with FIGS. 2-11 that follow.

Figure 2:
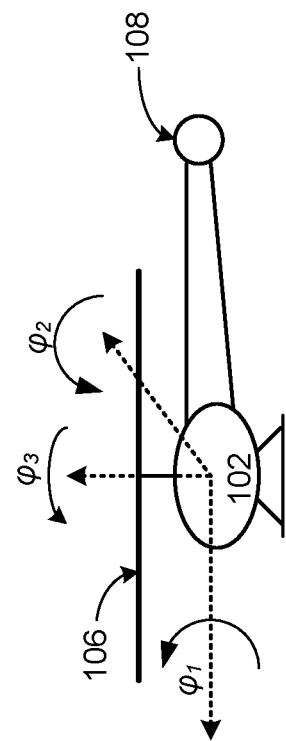
FIG. 2 is a pictorial/graphical representation that illustrates roll, pitch and yaw from the perspective of radio controlled aircraft 102 in accordance with an embodiment of the present invention.

FIG. 2 is a pictorial/graphical representation that illustrates roll, pitch and yaw axes from the perspective of radio controlled aircraft 102 in accordance with an embodiment of the present invention. A coordinate system is shown that is aligned from the perspective of the aircraft, and in particular from the perspective of an imaginary pilot of the RC aircraft 102. This aircraft coordinate system provides a way to describe the orientation of the RC aircraft 102 in three-dimensional space in terms of the angular displacements, roll, pitch and yaw.

In this coordinate system, clockwise rotation about a roll axis, aligned longitudinally along the length of the aircraft from the front to the tail, is represented by $\varphi_1$. When viewed from the back of the RC aircraft 102, clockwise rotation corresponds to a positive roll. Further, rotation about a pitch axis, aligned longitudinally from right to left through the center of the cockpit and perpendicular to the roll axis, is represented by $\varphi_2$. In this coordinate system, forward pitch of the aircraft 102 is positive pitch. The yaw-axis extends vertically through the shaft of main rotor 106 with counter-clockwise displacement represented by $\varphi_3$.

In an embodiment of the present invention, the aircraft 102 includes one or more controls that allow the aircraft to be rotated by an amount $\varphi_1$ about the roll axis, an amount $\varphi_2$ about the pitch axis and an amount $\varphi_3$ about the yaw axis. For instance, in an embodiment where RC aircraft 102 is implemented as a helicopter, forward and backward tilt of the main rotor 106 cause, respectively, positive and negative pitch angles $\varphi_2$. In addition, right and left tilts of the main rotor 106, cause, respectively, positive and negative roll angles $\varphi_1$. Further, the net thrust produced by the tail rotor, taking into consideration any torque induced by the rotation of main rotor 106, produces a yaw angle $\varphi_3$.

In an embodiment of the present invention, command data 104 from the remote control device 100 are generated in a different coordinate system, such as a user coordinate system that corresponds to the orientation of the user. This command data 104 can be transformed into control data in the coordinate system of the aircraft so that the RC aircraft 102 can be controlled based on its orientation to the user, rather than the orientation of an imaginary pilot. The generation of command data 104 and the transformation into control data used to control the orientation of the RC aircraft 102 will be discussed further in conjunction with FIGS. 5 and 6.

Figure 4:
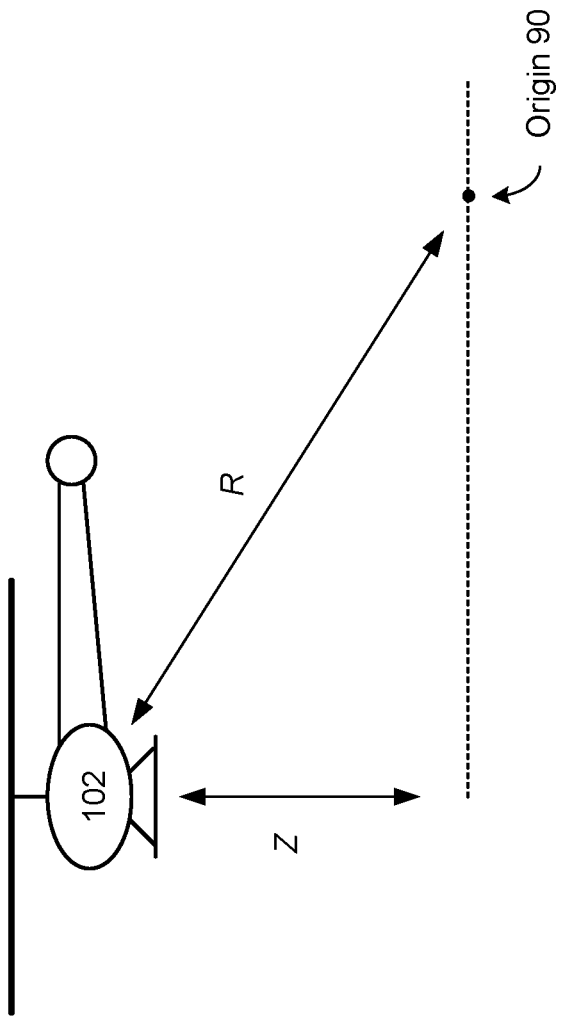
FIG. 4 is a pictorial/graphical representation that illustrates distance and altitude coordinates of radio controlled aircraft 102 with respect to the user coordinate system in accordance with an embodiment of the present invention.
Figure 3:
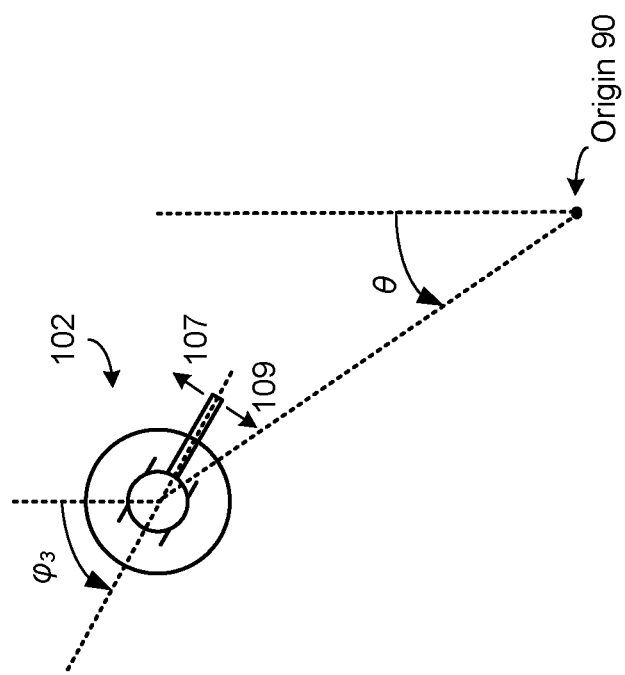
FIG. 3 is a pictorial/graphical representation that illustrates a yaw-axis from the perspective of radio controlled aircraft 102 and an angular orientation with respect to a user coordinate system in accordance with an embodiment of the present invention.

FIG. 3 is a pictorial/graphical representation that illustrates a yaw-axis from the perspective of radio controlled aircraft 102 and an angular orientation with respect to a user coordinate system in accordance with an embodiment of the present invention. FIG. 4 is a pictorial/graphical representation that illustrates distance and altitude coordinates of radio controlled aircraft 102 with respect to the user coordinate system in accordance with an embodiment of the present invention. In particular, rotation about a yaw-axis is shown in FIG. 3 in the aircraft coordinate system. In this coordinate system, the yaw-axis extends vertically through the shaft of main rotor 106 with a counter-clockwise angular displacement represented by $\varphi_3$. In an embodiment where RC aircraft 102 is implemented as a helicopter, a net counter-clockwise thrust 107 generated by the tail rotor 108 causes a positive deviation in the yaw $\varphi_3$. A net clockwise thrust 109 generated by the tail rotor 108 causes a negative deviation in the yaw $\varphi_3$.

The origin 90 indicates the placement of the origin of a user coordinate system that corresponds to the perspective of the user. In an embodiment of the present invention, the user coordinate system is a polar coordinate system. The position of RC aircraft 102 relative to the origin 90, can be represented by the altitude Z of the aircraft in relation to the origin 90, the distance R from the aircraft to the origin 90, and the angular displacement $\theta$ of the aircraft. In summary, the position of the RC aircraft 102 in three dimensional space can be represented in terms of (R, $\theta$, Z) and the orientation of the aircraft can be represented in terms of ($\varphi_1$, $\varphi_2$, $\varphi_3$).

Figure 5:
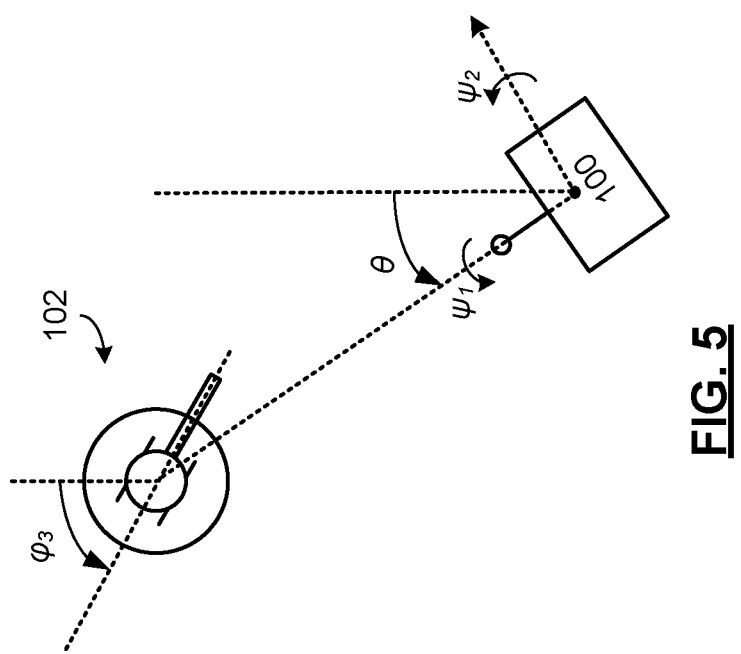
FIG. 5 is a pictorial/graphical representation that further illustrates the perspective of radio controlled aircraft 102 with respect to the remote control device 100 in accordance with an embodiment of the present invention.

FIG. 5 is a pictorial/graphical representation that further illustrates the perspective of radio controlled aircraft 102 with respect to the remote control device 100 in accordance with an embodiment of the present invention. In particular, this configuration assumes that the user of the remote control device would orient the device with changes of $\theta$, in order to face the RC aircraft 102, regardless of its position. In this configuration, if $\theta=\varphi_3$, pitch-axis commands from the perspective of the remote control device 100, represented by $\Psi_2$, and roll-axis commands from the perspective of the remote control device 100, represented by $\Psi_1$, correspond directly to pitch-axis controls $\varphi_2$ and roll-axis controls $\varphi_1$ of the RC aircraft 102. When however, $\theta \neq \varphi_3$, the implementation of a pitch-axis command $\Psi_2$, generally requires both roll-axis and pitch axis controls $\varphi_1$, $\varphi_2$. Similarly, the implementation of a roll-axis command generally requires also both roll-axis and pitch axis controls $\varphi_1$, $\varphi_2$.

In an embodiment of the present invention, remote control device 100 generates command data 104 that includes orientation commands $\Psi_1$, $\Psi_2$. RC aircraft 102 is capable of determining position parameters such as $\theta$ and $\varphi_3$ based on motion data generated by on-board motion sensors. RC aircraft 102 transforms the orientation commands $\Psi_1$, $\Psi_2$ into control data such as roll-axis and pitch axis controls $\varphi_1$, $\varphi_2$ as follows:

$$\varphi_1 = \Psi_1 \cos(\varphi_3 - \theta) + \Psi_2 \sin(\varphi_3 - \theta) \tag{1}$$

$$\varphi_2 = \Psi_2 \cos(\varphi_3 - \theta) + \Psi_1 \sin(\varphi_3 - \theta) \tag{2}$$

In this fashion, when a user commands the RC aircraft 102 to pitch forward, the RC aircraft will pitch forward from the perspective of the user, regardless of the actual orientation of the RC aircraft. In practice, a command to pitch forward could be implemented with a pitch forward control if the RC aircraft is facing away from the remote control device 100—when the user is oriented directly with the position of an imaginary pilot. However, other orientations yield other results:

if the RC aircraft is facing toward the remote control device 100, a command to pitch forward could be implemented with a pitch backward control;

if the RC aircraft is facing perpendicular to the remote control device 100, a command to pitch forward could be implemented with either a roll-right control or a roll-left control, depending on whether $\theta - \varphi_3 = 90°$ or $\theta - \varphi_3 = -90°$;

In other circumstances, some other combination of both roll-axis and pitch-axis controls $\varphi_1$, $\varphi_2$ is required, as set forth in the equations (1) and (2) above. Using these transformations, a remote control device 100 can command the RC aircraft 102 from the perspective of a user, independent of a yaw-orientation of the RC aircraft. For instance, when a user commands the RC aircraft 102 to pitch-forward or roll-left (from the user's perspective), the RC aircraft pitches forward or rolls left, regardless of the value of $\theta$ or $\varphi_3$.

In an embodiment of the present invention, RC aircraft 102 responds to a lift control L that controls the lift generated by varying either the velocity or pitch of the main rotor 106 and a yaw-axis control V that generates a positive or negative net thrust from the tail rotor 108. Remote control 100 generates a yaw-velocity command $v=d\varphi_3/dt$, and generates a lift command l to control the yaw-axis velocity and lift in a convention fashion, for instance L is equal to or proportion to l and Vis equal to or proportional to l. Remote control 100 can optionally generate additional controls for controlling other control functions as well as other features of the RC aircraft 102.

Figure 6:
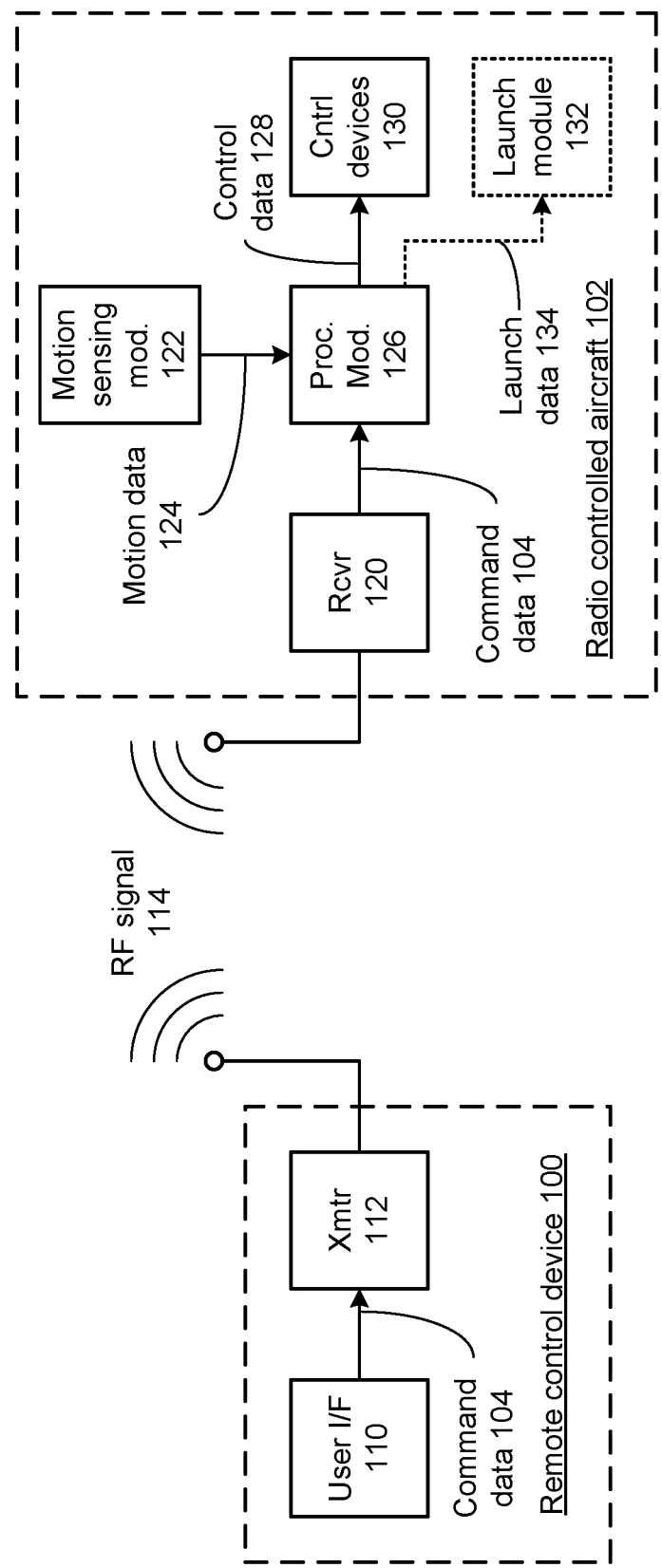
FIG. 6 is a schematic block diagram of a remote control device 100 and aircraft 102 in accordance with an embodiment of the present invention.

FIG. 6 is a schematic block diagram of a remote control device 100 and aircraft 102 in accordance with an embodiment of the present invention. In particular, remote control device 100 includes a user interface 110 such as one or more joy-sticks, click-wheels, buttons, dials, switches, levers or other user interface devices that respond to actions of the user and generate command data 104 in response thereto. Radio transmitter 112, generates and transmits an RF signal 114 that contains the command data 104.

RC aircraft 102 includes receiver 120 that is coupled to receive RF signal 114 from the remote control device 100 and to regenerate the command data 104 contained therein. In particular, command data 104 can include data that represents commands such as orientation commands $\Psi_1$, $\Psi_2$ in accordance with a coordinate system from a perspective of the remote control device 100, other command data that may or not be not transformed such as V and L, and other command data corresponding to other function and features.

RC aircraft 102 further includes a motion sensing module 122 that generates motion data 124 based on the motion of the RC aircraft 102. In an embodiment of the present invention, motion sensing module 122 includes one or more axes of accelerometers or gyroscopes or other devices that alone, or with further processing by processing module 126, can generate data that represents $\theta$, $\varphi_3$, and/or other motion parameters such as R, Z, etc., that can be used in transforming the command data 104 to control data 128.

Processing module 126, transforms the command data 104 into control data 128 in accordance with a coordinate system from a perspective of the RC aircraft. For example, processing module 126 can generate $\varphi_1$, $\varphi_2$, v and l, based on the command data 104 such as $\Psi_2$, V and L, and motion data 124 such as $\theta$, $\varphi_3$. This control data 128 is provided to a plurality of control devices 130 such as actuators, control surfaces, gimbals or other controllers that control the motion of RC aircraft 102 as previously described. In particular, control devices 130 and/or processing module can further include a feedback controller, state controller or other control mechanism that controls aircraft to the particular values of $\varphi_1$, $\varphi_2$, v and l.

Processing module 126 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 126 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, processing device 126 includes a look-up table, or other routine or application or that generates the control data 128 based on command data 104 and motion data 124 in accordance with the equations presented in conjunction with FIG. 5 or via one or more other transformations.

In a particular embodiment of the present invention, the command data 104 includes a mode selection that, based on its value, selects whether or not the RC aircraft 102 transforms the command data when calculating the control data 128. For instance, the command data can include a binary indicator that has one value that represents a traditional mode of operation and another value that transforms command data 104 to generate control data 128. In this embodiment, the user can select to operate the RC aircraft 102 in one mode that transforms orientation commands from the remote control device 100 from the perspective of the remote control device 100 to the perspective of the RC aircraft 102. Further, the user can instead select to operate the RC aircraft 102 in a traditional fashion by generating command data 104 from the perspective of the aircraft itself with yaw-axis controls being proportional to yaw-axis commands and pitch-axis controls being proportional to pitch-axis commands. In this fashion, a user can select the mode he or she finds easiest to use. In addition, different users could select to operate the RC aircraft 102 in different modes.

RC aircraft 102 optionally includes a launch module 132 that responds to launch data 134 included in command data 104 to launch an object from the RC aircraft 102, such as a parachutist action figure, bomb missile or other toy or object. Launch module 132 can include a magnetic coupling, retractable hook or other releasable coupling that holds and selectively releases one or more object in respond to the launch command, either successively, one object at a time in response to repeated transmissions of the launch data from the remote control device 100 or based on individual launch data separately identified for each such object.

In one possible implementation of remote control device 100, user interface 110 includes a plurality of spring-loaded interface devices, where each of the plurality of spring-loaded interface devices has a return position that is returned to when no force is applied. In this implementation, the remote control device 100 commands the RC aircraft to hover or substantially hover when no force is applied to each of the plurality of spring-loaded interface devices. For example, the pitch-axis, roll-axis and lift command interface devices can have a position, such as a center position they return to. The center position of the pitch-axis and roll-axis interface devices operate to generate command data 104 for the pitch-axis and roll-axis to correspond to horizontal flight or substantially horizontal flight within an acceptable level of tolerance. The center position of the lift command interface device operates to generate a lift command that corresponds to a lift force that equals or substantially equals the weight of the RC aircraft 102. Where the weight of the RC aircraft changes, such as when objects are selectively launched or dropped from the aircraft, the processing module 126 can determine a current weight for the RC aircraft 102 based on whether objects have been dropped, how many objects and/or which objects have been dropped, etc.

Figure 7:
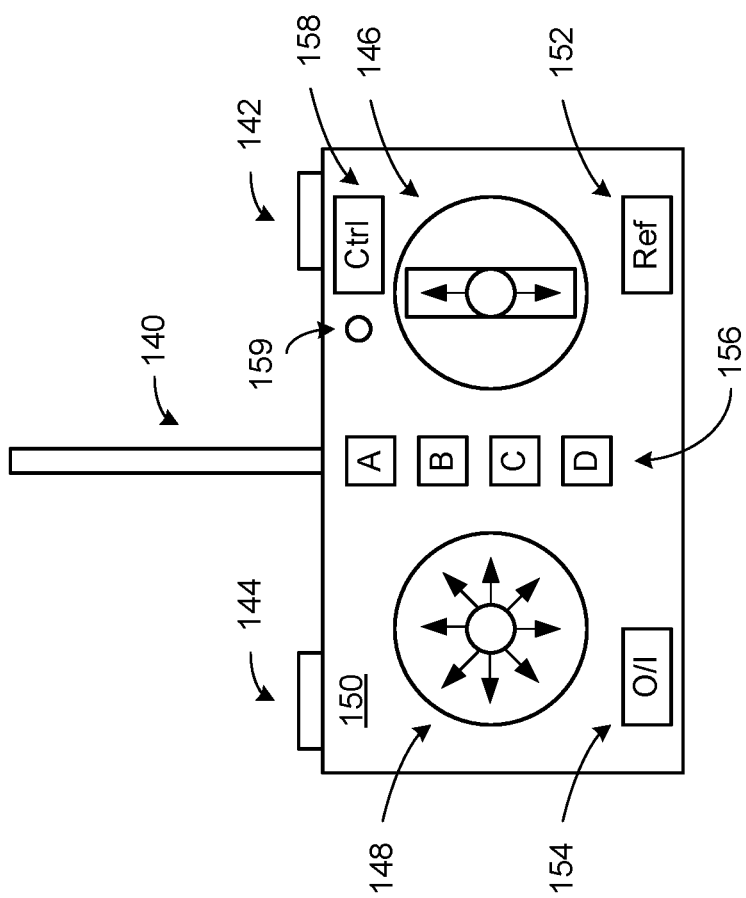
FIG. 7 is a pictorial representation of a remote control 150 in accordance with an embodiment of the present invention.

FIG. 7 is a pictorial representation of a remote control 150 in accordance with an embodiment of the present invention. In particular remote control 150, such as remote control device 100, includes am antenna 140 for coupling to a receiver, such as receiver 120. Button 142, when pressed by a user, generates a clockwise yaw-velocity command. In a similar fashion, button 144, when pressed by a user, generates a counter-clockwise yaw-velocity command. Lift command device includes a spring-loaded lever that generates a lift command corresponding to a hover-state, when in the center position. The lift command can command an increased lift force when pushed up to raise the RC aircraft 102 and a decreased lift force when pushed down to lower the RC aircraft 102. Two-axis joystick 148 can be displaced in two-dimensions about a center position. Upward and downward displacements of the joystick 148 correspond to pitch axis commands and right and left displacements correspond to roll-axis commands. When the force is removed from the joystick 148, it returns to a center position that generates command data 104 corresponding to horizontal flight.

Remote control 150 further includes a reference button, for setting the reference position of the RC aircraft 102 to aid in the determination of motion data 124, as will be described in greater detail in conjunction with FIG. 8. An on-off button 154 is included. Mode control button 158 is used to select a mode of operation for the remote control. For instance, mode control button 158 can operate on a toggle basis to set or reset the mode to either a mode where joystick 148 and lever 146 operate to generate traditional command data 104 used to generate controls from the perspective of the RC aircraft, or another mode where command data 104 is transformed from the perspective of the remote control 150 to the perspective of the RC aircraft 102. Indicator light 159 can be included to indicate the particular mode selected, by a unique color or by being either on or off.

Additional buttons 156 are included for activating other functions and features of RC aircraft 102 such as the generation of launch data 130 for one or more objects or to implement other optional features.

FIG. 8 is a pictorial representation of a radio controlled aircraft 102 launching parachutists 166 and 168 in accordance with an embodiment of the present invention. In this embodiment RC aircraft 102 travelling at trajectory 160 includes a launch module 132 that responds to launch data 134 from a remote control device 102 to launch a first action-figure 166, configured as a parachutist, at a first time along trajectory 164. RC aircraft 102 launches a second action-figure 168, also configured as a parachutist, at a subsequent time along trajectory 162.

FIG. 9 is a pictorial/block diagram representation of the set-up of remote control device 100 and radio controlled aircraft 102 in accordance with an embodiment of the present invention. In particular, in this mode of operation, motion sensing module 124 generates motion data 126 based on the relative motion of the RC aircraft 102. The remote control device 100 and RC aircraft 102 establish an initial position of RC aircraft 102 that can be used by motion sensing module 124 that serves as an origin or other reference position. For instance, the user can be instructed to place the RC aircraft 102 on the ground, a predetermined distance, $R_{ref}$ from the remote control device 100 with the tail of the RC aircraft aligned in the direction of remote control device 100 along axis 170. Pressing the reference button, such as reference button 152, in this position establishes initial conditions: $R=R_{ref}$, $\theta=0$, $Z=0$, $\varphi_1=0$, $\varphi_2=0$, and $\varphi_3=0$. As the RC aircraft 102 is subsequently moved in operation, the relative motion of the RC aircraft, reflected by motion data 124, can be used to determine a position and orientation of the RC aircraft 102 from the origin established by the position of remote control 100 during setup.

FIG. 10 is a flowchart representation of a method in accordance with an embodiment of the present invention. In particular a method is presented for use with one or more features or functions presented in conjunction with FIGS. 1-9. In step 400, an RF signal is received from a remote control device, the RF signal containing command data in accordance with a first coordinate system, wherein the first coordinate system is from a perspective of the remote control device. In step 402 motion data is generated based on the motion of the RC aircraft. In step 404, the command data is transformed into control data in accordance with a second coordinate system, wherein the second coordinate system is from a perspective of the RC aircraft. In step 406, the motion of the RC aircraft is controlled based on the control data.

In an embodiment of the present invention, the command data includes roll-axis command data and pitch-axis command data, the control data includes roll-axis control data, and the motion data includes yaw-axis motion data, and wherein step 404 includes generating the roll-axis control data as a function of the roll-axis command data, pitch-axis command data and the yaw-axis motion data. In addition, the command data can include roll-axis command data and pitch-axis command data, the control data can include pitch-axis control data, and the motion data includes yaw-axis motion data, and wherein step 404 includes generating the pitch-axis control data as a function of the roll-axis command data, pitch-axis command data and the yaw-axis motion data. The RF signal can include mode data, and wherein, when the mode data has a first value, step 404 is selectively bypassed and the control data generated in proportional to the command data.

The command data can include lift command data and the control data can include lift control data, wherein step 404 includes generating the lift control data based on a weight of the RC aircraft. The command data can include yaw-velocity command data and the control data can includes yaw-velocity control data and wherein step 404 includes generating yaw-velocity control data as a proportion of the yaw-velocity command data.

FIG. 11 is a flowchart representation of a method in accordance with an embodiment of the present invention. In particular a method is presented for use with one or more features or functions presented in conjunction with FIGS. 1-10 wherein command data includes launch data. In step 410, an object is launched from the RC aircraft in response to the launch data. In an embodiment of the present invention, the object includes a parachute, parachutist action figure, toy missile or bomb or other object.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to order of magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio controlled (RC) vehicle comprising:
a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-axis command data, and wherein the first coordinate system is from a perspective of the remote control device;
motion sensors configured to generate motion data, wherein the motion data indicates a position of the RC vehicle and an orientation of the RC vehicle, wherein the orientation of the RC vehicle is a yaw-axis orientation from the perspective of an imaginary pilot of the RC vehicle, wherein the motion sensors include a first motion sensor and a second motion sensor, wherein the first motion sensor includes an accelerometer, and wherein the second motion sensor includes a gyroscope;
a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-axis control data, and wherein the yaw-axis control data is related to the yaw-axis command data; and
control devices coupled to the processor, the control devices configured to control motion of the RC vehicle based on the control data, wherein the control devices are configured to cause the RC vehicle to enter the hovering state in response to the receiver receiving the command data that indicates the lift command.

2. The RC vehicle of claim 1, wherein the motion data indicates the position of the RC vehicle relative to a position of the remote control device.

3. The RC vehicle of claim 2, wherein the position of the RC vehicle is generated to indicate an angle relative to the remote control device.

4. The RC vehicle of claim 3, wherein the first coordinate system from the perspective of the remote control device considers the remote control device to be reoriented by a user of the remote control device to face the RC vehicle responsive to changes in the position of the RC vehicle.

5. The RC vehicle of claim 4, wherein the command data is transformed based on a difference between the angle relative to the remote control device and the orientation of the RC vehicle.

6. The RC vehicle of claim 1, wherein the position of the RC vehicle is generated to include at least two coordinates.

7. The RC vehicle of claim 6, wherein the orientation of the RC vehicle is generated to include at least two coordinates.

8. The RC vehicle of claim 1, wherein the position of the RC vehicle is generated to include at least three coordinates.

9. The RC vehicle of claim 8, wherein the orientation of the RC vehicle is generated to include at least three coordinates.

10. The RC vehicle of claim 1, wherein the command data is transformed based on a difference between an angle relative to the remote control device and the orientation of the RC vehicle.

11. A radio controlled (RC) vehicle comprising:
a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-axis command data, wherein the first coordinate system is from a perspective of the remote control device that considers the remote control device to be oriented by a user of the remote control device to face the RC vehicle responsive to changes in a position of the RC vehicle;
motion sensors configured to generate motion data, wherein the motion data indicates the position of the RC vehicle and an orientation of the RC vehicle, wherein the motion data indicates the position of the RC vehicle relative to a position of the remote control device, wherein the position of the RC vehicle is generated to indicate an angle relative to the remote control device, wherein the motion sensors include a first motion sensor and a second motion sensor, wherein the first motion sensor includes an accelerometer, and wherein the second motion sensor includes a gyroscope;

a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-axis control data, and wherein the yaw-axis control data is related to the yaw-axis command data; and control devices coupled to the processor, the control devices configured to control motion of the RC vehicle based on the control data, wherein the control devices are configured to cause the RC vehicle to enter the hovering state in response to the receiver receiving the command data that indicates the lift command;

wherein the command data is transformed based on a difference between the angle relative to the remote control device and the orientation of the RC vehicle.

12. The RC vehicle of claim 11, wherein the orientation of the RC vehicle is a yaw-axis orientation from the perspective of an imaginary pilot of the RC vehicle.

13. The RC vehicle of claim 11, wherein the position of the RC vehicle is generated to include at least two coordinates.

14. The RC vehicle of claim 13, wherein the orientation of the RC vehicle is generated to include at least two coordinates.

15. The RC vehicle of claim 11, wherein the position of the RC vehicle is generated to include at least three coordinates.

16. The RC vehicle of claim 15, wherein the orientation of the RC vehicle is generated to include at least three coordinates.

17. A radio controlled (RC) vehicle comprising:

a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-axis command data, wherein the first coordinate system is from a perspective of the remote control device that considers the remote control device to be oriented by a user of the remote control device to face the RC vehicle responsive to changes in a position of the RC vehicle;

motion sensors configured to generate motion data, wherein the motion data indicates the position of the RC vehicle and an orientation of the RC vehicle, wherein the orientation of the RC vehicle is a yaw-axis orientation from the perspective of an imaginary pilot of the RC vehicle, wherein the position of the RC vehicle is generated to include at least three coordinates, wherein the motion sensors include a first motion sensor and a second motion sensor, wherein the first motion sensor includes an accelerometer, and wherein the second motion sensor includes a gyroscope;

a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-axis control data, and wherein the yaw-axis control data is related to the yaw-axis command data; and control devices coupled to the processor, the control devices configured to control motion of the RC vehicle based on the control data, wherein the control devices are configured to cause the RC vehicle to enter the hovering state in response to the receiver receiving the command data that indicates the lift command.

18. The RC vehicle of claim 17, wherein the motion data indicates the position of the RC vehicle relative to a position of the remote control device.

19. The RC vehicle of claim 18, wherein the position of the RC vehicle is generated to indicate an angle relative to the remote control device.

20. The RC vehicle of claim 17, wherein the orientation of the RC vehicle is generated to include at least three coordinates.

* * * * *